United States Patent [19]
Edwards

[11] 3,778,103
[45] Dec. 11, 1973

[54] VEHICLE SEAT
[75] Inventor: Robert L. Edwards, Mansfield, Ohio
[73] Assignee: National Seating Company, Mansfield, Ohio
[22] Filed: June 30, 1971
[21] Appl. No.: 158,230

[52] U.S. Cl................. 297/331, 297/340, 297/359
[51] Int. Cl......................... B60n 1/06, A47c 1/032
[58] Field of Search................... 297/333, 332, 331, 297/324, 340, 359, 364, 374, 365, 362, 360

[56] References Cited
UNITED STATES PATENTS
| 3,495,872 | 2/1970 | Gielow | 297/340 |
| 3,148,916 | 9/1964 | Hendrickson | 297/333 |
| 3,586,372 | 6/1971 | Barecki | 297/374 |
| 3,276,816 | 10/1966 | Edwards | 297/359 |
| 2,962,087 | 11/1960 | Barecki | 297/359 X |

Primary Examiner—Francis K. Zugel
Attorney—Donnelly, Maky, Renner & Otto

[57] ABSTRACT

A vehicle seat having pivotally mounted seat and back cushions, with the position of the back cushion being adjustable by a recline actuator in the seat arm, such actuator having a cam operated trip release mechanism associated therewith which is operative both automatically to return the back cushion to an upright position by releasing the actuator when the seat cushion is pivoted upwardly and to hold the seat back in its upright position when the seat is subsequently pivoted downwardly.

10 Claims, 7 Drawing Figures

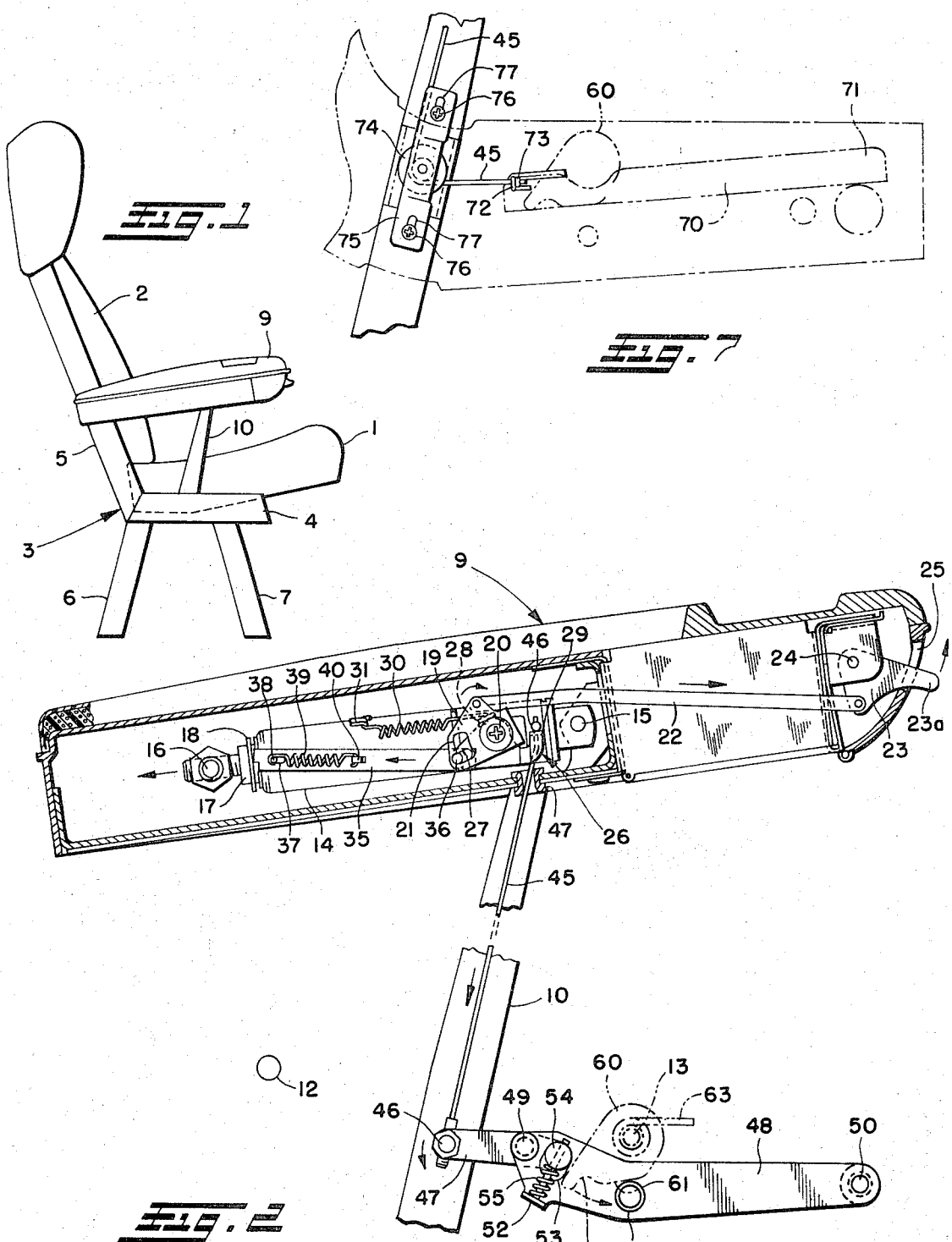

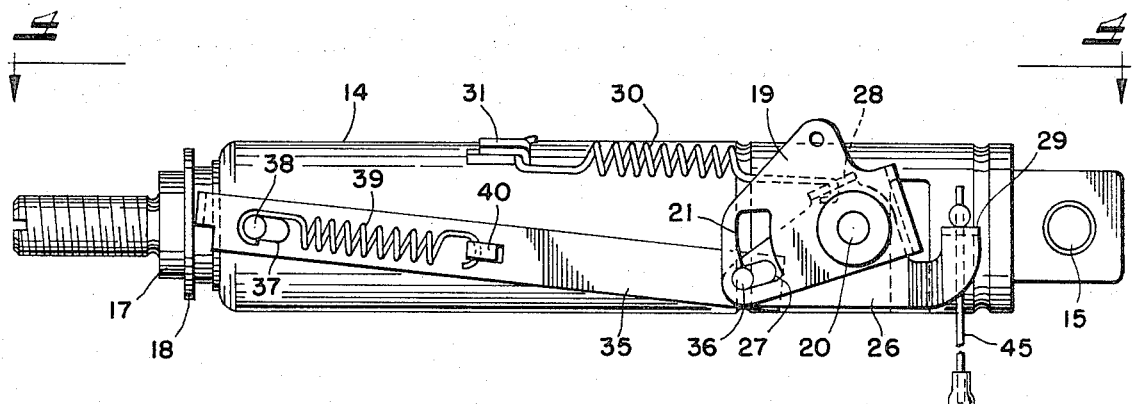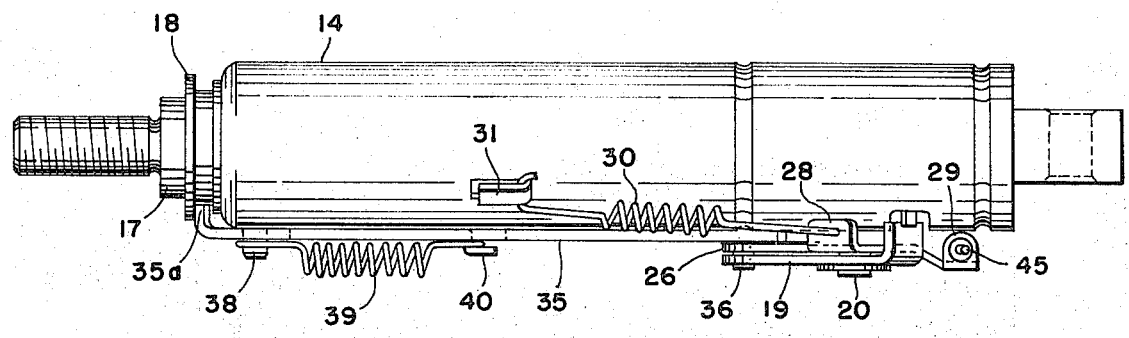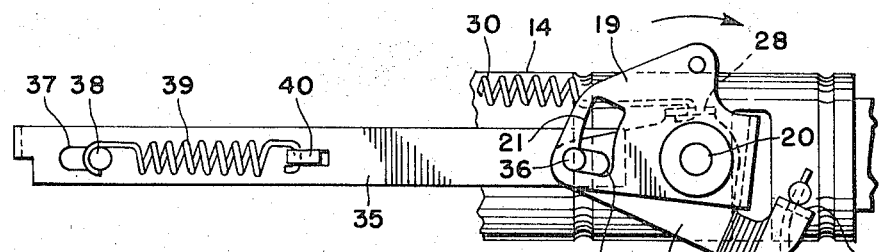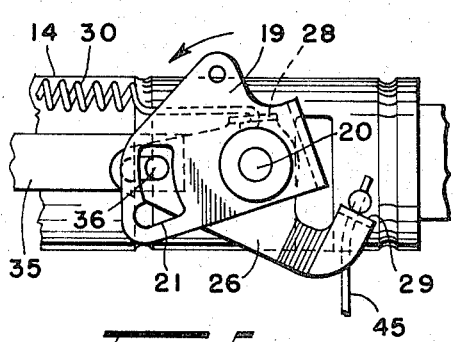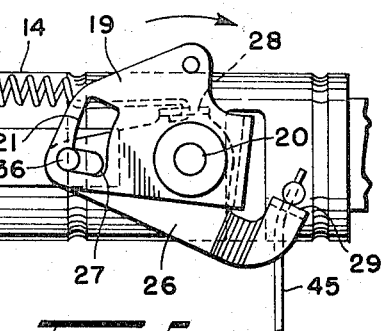

3,778,103

VEHICLE SEAT

This invention relates generally as indicated to a vehicle seat and more particularly to a seat incorporating an interlock between the seat back recline mechanism and the seat cushion such that when the latter is pivoted upwardly, the seat back automatically returns to its upright position and is locked in place irrespective of a subsequent return of the seat cushion to its position of occupancy.

In vehicles such as buses, airplanes, and the like, the seats are arranged in parallel rows fairly close to each other and may extend three deep from an aisle. Access to a window seat or a seat furthest from the aisle may be quite difficult especially if the seats ahead have the seat backs reclined to any extent. This seat access problem is a particular burden for maintenance personnel when cleaning between and beneath the rows of seats.

The seat access problem can be solved by a seat which can quickly and simply be folded into a compact condition without requiring release of back recline mechanisms which are generally located in a seat arm rest with the mechanism actuator being on the interior of the rest principally accessible to the seat occupant.

It would accordingly be helpful to both seat users and maintenance personnel to have a vehicle seat which can quickly and easily be folded into a compact condition to permit free movement therepast and to provide access between the seat rows. Reference may be had to U.S. pat. No. 3,495,872 which shows a seat back adapted automatically to return to its upright position responsive to the seat cushion being lifted to its parallel upright position.

It is therefore a principal object of the present invention to provide a vehicle seat wherein the back and seat cushion will automatically fold into a compact or upright locked position responsive to the occupant leaving the seat.

Another object of the present invention is the provision of a vehicle seat having a recline mechanism in the seat arm which is automatically released when the seat cushion is pivoted upwardly to bring the seat back to an upright position and to hold the same in such position irrespective of the subsequent return of the seat cushion to its horizontal position.

Other objects and advantages of the present invention will become apparent as the following description proceeds.

To the accomplishment of the foregoing and related ends, the invention, then, comprises the features hereinafter fully described, the following description and the annexed drawings setting forth in detail a certain illustrative embodiment of the invention, this being indicative, however, of but one of the various ways in which the principles of the invention may be employed.

In the annexed drawings:

FIG. 1 is a reduced side elevation of the vehicle seat according to the present invention with the back in a normal recline position and with the seat cushion occupied;

FIG. 2 is an enlarged side elevation of the seat back and seat cushion control mechanism, with the encasing seat structure of FIG. 1 removed to enhance the illustration;

FIG. 3 is an enlarged side elevation showing the seat back recline mechanism and the cam operated trip release, with the latter being in a position in which the seat back is locked and the seat cushion is occupied;

FIG. 4 is an enlarged plan of the recline mechanism and cam operated trip release taken along line 4—4 of FIG. 3;

FIG. 5 is an enlarged fragmentary elevation similar to FIG. 3 with the cam operated trip release in a position in which the actuator has released or unlocked the seat back recline mechanism;

FIG. 6 is an enlarged fragmentary elevation similar to FIGS. 3 and 5 with the cam operated trip release in a position in which the seat back is upright and locked and the seat cushion is upright and parallel to the seat back; and FIG. 7 is an enlarged fragmentary elevation of an alternative embodiment for the seat cushion control mechanism shown in FIG. 2.

Referring now to the annexed drawings and more particularly to FIG. 1, the vehicle seat of the present invention comprises a seat cushion 1 and seat back 2 both pivotally mounted on frame 3 which includes a horizontal base frame member 4 and an upwardly inclined back frame member 5, the former being supported by legs 6 and 7. An arm rest 9 extends forwardly from the top of the frame member 5 and is supported above the base frame member 4 by hollow strut 10.

Referring now to FIG. 2, the seat back 2 is pivotally mounted on the back frame member at 12 while the seat cushion is pivotally mounted on the base frame member at 13. The seat cushion pivot 13 is below and forwardly offset from the back cushion pivot 12 so that the seat and back cushion may be folded into a relatively small package. In the folded condition, the seat cushion 1 and seat back 2 assume substantially vertical and parallel positions, thereby to provide easy access either to the floor space under the seat or to the window seat furthest from the aisle.

A seat recline mechanism 14, which is generally conventional and forms no part of the present invention, is provided in the arm 9, such mechanism being connected at its forward end to the arm at 15 and at its rearward end to the seat back at 16. The recline mechanism has a telescoping slide 17 spring-loaded to the retracted position shown, with an annular outwardly projecting shoulder 18 being provided thereon. The spring biasing of the telescoping slide 17 is conventional, as shown by the spring S in FIG. 1 of Gielow U.S. Pat. No. 3,495,872. The slide may be released or locked by pivotal movement of actuator 19 between its two positions shown in FIG. 5 and FIG. 2, respectively, such acutator being mounted on shaft 20. The limited rotation of the shaft 20 caused by concurrent pivotal movement of actuator 19 is operative to engage or release slide bars on the telescoping slide through a conventional wedge locking means of the type shown in Edwards U. S. Pat. No. 3,276,816.

The actuator 19 has an L-shape slot 21 at the lower rear portion thereof for reasons to be set forth hereinafter. A forwardly extending operating lever 22 is connected at its rear portion to the top of actuator 19 and is connected at its distal end to release knob 23, which is pivotally mounted at 24 to arm 9. Release knob 23 has a projection 23a which extends through the front end face of arm 9, such projection being received in an elongated slot 25 therein which allows the seat occupant to pivot the knob 23 upwardly as shown by the arrow in FIG. 2.

Control means for locking or releasing the recline mechanism includes a seat lock cam 26 that is pivotally mounted on shaft 20 directly behind actuator 19, but is free to pivot independently of such shaft. The lock cam has an elongated slot 27 at its lower terminal portion, an inwardly projecting tab 28 at its top intermediate portion, and a tab 29 with a centrally located aperture at its forward end. A tension spring 30 is connected at one end to tab 28 and at the other end to detent 31 on actuator 14, thereby normally to bias the lock cam 26 in a counterclockwise direction as viewed in FIG. 2.

A slide trip link 35 is positioned immediately behind lock cam 26 and has an outwardly directed cylindrical pin 36 at its forward end which extends through both slot 27 of cam 26 and slot 21 of actuator 19, thereby to form a "lost motion" connection between lock cam 26 and actuator 19. The link 35 has an inwardly bent flange 35a at its other end, as best shown in FIG. 4, and adjacent such other end, the link is provided with an elongated slot 37 which receives therein an outwardly extending fixed cylindrical pin 38 on the side of actuator 14. A tension spring 39 is connected at one end to pin 38 while at the other end it is connected to tab 40 on the link, thereby to bias slide trip link 35 to the left as viewed in FIG. 2 and normally to maintain pin 36 against the back of slot 27 and in the substantially horizontally leg portion of L-shape slot 21. Such positioning of the pin 36 serves to lock the actuator 19 and seat lock cam 26 together for concurrent pivotal movement.

Referring now to FIG. 2, a trip link or flexible cable 45 is connected to tab 29 of seat lock cam 26 by swaged end fitting 46, such cable passing downwardly through guide aperture 47 in arm 9 into hollow strut 10. At its bottom end, cable 45 is connected at 46 to swing link 47, such link being pivotally connected to cam link 48 by pin 49. Cam link 48 is pivotally connected at its distal end 50 to base frame member 4 and has a follower roller 51 extending laterally inwardly therefrom. Cam link 48 is additionally provided with shoulder 52 and a vertically offse elongated slot 53 in which an outwardly projecting pin 54 on swing link 47 is received, the pin 54 being normally maintained against the top of slot 53 by spring 55 interposed between shoulder 52 and pin 54.

The seat 1 has a cam plate 60 fixedly attached thereto, such plate having a camming surface 61 in contact with follower roller 51 on cam link 48. The camming surface 61 terminates in an arcuate stop 62 configured to embracingly cooperate with follower roller 51 as will be described in more detail hereinafter. The follower roller 51 is maintained against surface 61 by flexible link 45, with the spring loaded pivotal connection between swing link 47 and cam link 48 allowing the former to pivot slightly upwardly for ease of assembly and for avoidance of possible damage to the parts. A coil spring 63 at pivot 13 urges or biases the seat cushion 1 in a counterclockwise direction, whereby the seat cushion automatically will return to its vertical or upright position when the occupant leaves the seat.

Referring now to FIG. 7, the alternative control mechanism associated with cam 60 on the seat cushion includes a lever 70 of predetermined length pivoted at its distal end 71 to base frame member 4. At its other end, lever 70 receives the lower end of flexible link 45 in an aperture in flange 72, such link being retained by suitable means such as a nut 73 threaded onto the link against the front surface of the flange. Link 45 is drawn around pulley guide 74 rotatably mounted on bracket 75. The bracket is attached to base frame member 4 by two screws 76 received in elongated slots 77, such slots providing vertical adjustability for the bracket. Such adjustability allows the flexible link readily to be installed and any worn link to be removed and replaced.

OPERATION

Referring now more particularly to FIGS. 3 and 5 and initially FIG. 3, it will be seen that the seat in the condition there illustrated has the seat back locked in any position of recline with the seat cushion occupied. The seat occupant may, of course, adjust the position of the seat back by moving the actuator control knob 23 upwardly as indicated by the arrow in FIG. 2, thereby moving actuator lever 22 forwardly and rotating actuator 19 and seat lock cam 26 clockwise as shown in FIG. 5. When the actuator attains the position shown in such figure, the recline mechanism is unlocked and the occupant may adjust the seat backwardly or forwardly to the desired position of recline by exerting pressure on the seat back or allowing the spring loaded seat back to return. The sring 39 will urge the slide trip link 35 to the left as shown in FIG. 5 and keep pin 36 in the short leg portion of the L-shape slot, thereby to maintain actuator 19 and seat lock cam 26 in a locked relationship for concurrent pivotal movement. Thus, when the actuator knob 23 is released, the spring 30 will return the seat lock cam 26 and actuator 19 to the position shown in FIG. 3, such position of the actuator locking the recline mechanism, thereby to maintain the seat back in the position selected. It will be appreciated that spring 30 is selected to be stronger than spring 39 so that upon the release of actuator knob 23 the spring 30 will be able fully to return the actuator to its locked position.

FIG. 2, with the seat occupied, the cam 60 and cam link 48 are in the substantially horizontal position shown. When the occupant leaves the seat with the seat back in a reclined position, the seat cushion will be rotated in a counterclockwise direction by spring 63, with cam plate 60 rotating in the same direction as indicated by the arrow in FIG. 2. The seat cushion will continue to rotate until arcuate stop 62 on cam plate 60 engages follower roller 51, such engagement maintaining the seat cushion 1 in a pre-selected substantially vertical position. Surface 61 of cam 60 as it moves along roller 51 will force such roller downwardly which in turn will similarly move swing link 47 (or lever 70) and cable 45 in a downward direction. Such movement will rotate seat lock cam 26 and actuator 19 locked thereto in a clockwise direction to the position shown in FIG. 5, with pin 36 to the far left extreme of slot 27 and in the short leg of slot 21. The recline mechanism will be unlocked by the rotation of actuator 19 to its FIG. 5 position and the telescoping slide will move to the right under the bias of the spring contained within actuator 14.

As the seat back approaches its upright position, annular shoulder 18 will contact flange 35a of slide link 35 and force such link to the right since the spring within actuator 14 is selected to be stronger than spring 39. Pin 36 will clear the short leg of L-shape slot 21 as a result of the movement of slide trip link 35, and the actuator 19 will rotate counterclockwise as shown in FIG. 6 under the force of gravity so that pin 36 is positioned in the long vertical leg of L-shape slot 21. The return of the actuator 19 to the FIG. 6 position locks the recline mechanism to hold the seat back in its upright position.

When the seat cushion 1 is returned to the horizontal position, the tension on cable 45 will be released and spring 30 will return the seat lock cam 26 to its FIG. 3 position. In such position, the seat lock cam 26 is again locked to the actuator 19, and the seat back control mechanism is thereby operatively engaged to repeat the above defined functional sequence. Thus, it will be appreciated that when the seat is unoccupied, the seat back will be locked in an upright position and the seat cushion will likewise be locked in an approximately vertical orientation, thereby to maintain the seat in the smallest possible package which provides more room between the seats to permit passengers or maintenance personnel to pass in and out.

The embodiments of the invention in which an exclusive property or privilege is claimed are defined as follows:

1. A vehicle seat comprising a spring loaded pivotally mounted seat back, a pivotally mounted seat cushion movable between a lowered use position and a raised position, an arm rest, a seat back recline mechanism in said arm rest operative to lock said seat back in a selected recline position, an actuator for said recline mechanism having two positions, the first position releasing the seat back to permit pivotal movement and the second position locking the seat back against movement, and control means operative responsively to upward pivoting of the seat cushion from its lowered use position to move said actuator to said first position to release said seat back recline mechanism automatically to bring the seat back to an upright position, and means operative at that position to release said actuator from said control means whereby said actuator independently moves to the second position to lock the seat back in such upright position, whereby subsequent movement of said seat cushion from its raised position to its lowered use position will not unlock said seat back.

2. A vehicle seat as set forth in claim 1, wherein said pivotally mounted seat cushion is spring loaded automatically to return to its upright position when unoccupied, thereby to actuate said control means.

3. A vehicle seat as set forth in claim 2, wherein said control means further includes a cam mounted on said cushion for pivotal movement therewith, and follower means for said cam connected to said actuator operative only upon pivoting of the seat cushion upwardly to shift the actuator to the second position by movement of the cam with respect to said follower means.

4. A vehicle seat as set forth in claim 3, wherein said follower is connected to said actuator by a trip release mechanism, such mechanism including a flexible link extending through a strut supporting said arm rest and a pivotally mounted lock cam in said arm rest to which the upper end of the link is connected.

5. A vehicle seat as set forth in claim 4, wherein said lock cam and actuator are operatively locked together for concurrent pivotal movement except when said seat back and said seat cushion are in upright positions.

6. A vehicle seat as set forth in claim 5, wherein said lock cam and actuator are locked together by said actuator release means consisting of a lost motion device having a slide trip link with a pin extending through an elongated slot in said lock cam and an L-shape slot in said actuator, said L-shape slot having a substantially horizontal short leg portion.

7. A vehicle seat as set forth in claim 6, wherein said slide trip link is normally spring biased to maintain said pin in a position against the back of said elongated slot and in the short leg of the L-shape slot, thereby to lock said lock cam and actuator together.

8. A vehicle as set forth in claim 7, wherein said recline mechanism is adapted to move said slide trip link against the spring bias to unseat the pin from the short leg portion of the L-shape slot when the seat back and cushion are in an upright position, thereby to unlock said actuator from the lock cam and to allow the former to return to its first locking position.

9. A vehicle seat as set forth in claim 5, further including an operating rod connected to and extending forwardly from said actuator for operation of the same and a biasing means for urging said lock cam rearwardly within said arm rest, said biasing means acting normally to maintain said actuator in its first position when said actuator is locked to said lock cam.

10. A vehicle seat as set forth in claim 1, wherein said actuator is adapted for movement independent of said control means to release said seat back irrespective of seat cushion position.

* * * * *